United States Patent
Shah et al.

(10) Patent No.: US 10,150,275 B2
(45) Date of Patent: Dec. 11, 2018

(54) METALLIZED POLYETHYLENE FILM WITH IMPROVED METAL ADHESION

(71) Applicants: Dow Global Technologies LLC, Midland, MI (US); Dow Chemical (Malaysia) Sdn. Bhd., Kuala Lumpur (MY); Dow Chemical IMEA GmbH, Horgen (CH)

(72) Inventors: Prajwal Shah, Navi Mumbai (IN); Shashibhushan S. Mishra, Pune (IN); Tamanna Duggal, Delhi (IN); Prashant Mogre, Dubai (AE); Eng Kian Ma, Klang (MY)

(73) Assignees: Dow Global Technologies LLC, Midland, MI (US); Dow Chemical (Malaysia) Sdn. Bhd., Kuala Lumpur (MY); Dow Chemical IMEA GmbH, Horgen (CH)

( * ) Notice: Subject to any disclaimer, the term of this patent is extended or adjusted under 35 U.S.C. 154(b) by 396 days.

(21) Appl. No.: 14/900,644

(22) PCT Filed: Jul. 2, 2013

(86) PCT No.: PCT/US2013/049007
§ 371 (c)(1),
(2) Date: Dec. 22, 2015

(87) PCT Pub. No.: WO2014/209411
PCT Pub. Date: Dec. 31, 2014

(65) Prior Publication Data
US 2016/0144603 A1    May 26, 2016

(30) Foreign Application Priority Data

Jun. 27, 2013    (IN) .......................... 1906/DEL/2013

(51) Int. Cl.
| | | |
|---|---|---|
| *B32B 1/02* | (2006.01) |
| *B32B 15/085* | (2006.01) |
| *B32B 27/32* | (2006.01) |
| *B32B 27/36* | (2006.01) |
| *B32B 7/12* | (2006.01) |
| *B32B 15/09* | (2006.01) |
| *B32B 7/00* | (2006.01) |
| *B32B 7/02* | (2006.01) |
| *B32B 7/04* | (2006.01) |
| *B32B 15/00* | (2006.01) |
| *B32B 15/04* | (2006.01) |
| *B32B 15/08* | (2006.01) |
| *B32B 27/00* | (2006.01) |

(Continued)

(52) U.S. Cl.
CPC .............. *B32B 15/085* (2013.01); *B32B 1/02* (2013.01); *B32B 7/00* (2013.01); *B32B 7/02* (2013.01); *B32B 7/04* (2013.01); *B32B 7/12* (2013.01); *B32B 15/00* (2013.01); *B32B 15/04* (2013.01); *B32B 15/08* (2013.01); *B32B 15/09* (2013.01); *B32B 27/00* (2013.01); *B32B 27/06* (2013.01); *B32B 27/08* (2013.01); *B32B 27/32* (2013.01); *B32B 27/36* (2013.01); *B32B 2250/00* (2013.01); *B32B 2250/03* (2013.01); *B32B 2255/00* (2013.01); *B32B 2255/06* (2013.01); *B32B 2264/00* (2013.01); *B32B 2307/00* (2013.01); *B32B 2307/40* (2013.01); *B32B 2307/514* (2013.01); *B32B 2307/518* (2013.01); *B32B 2307/542* (2013.01); *B32B 2307/544* (2013.01); *B32B 2307/546* (2013.01); *B32B 2307/7242* (2013.01); *B32B 2307/732* (2013.01); *B32B 2307/75* (2013.01); *B32B 2439/00* (2013.01); *B32B 2439/06* (2013.01); *B32B 2439/46* (2013.01); *B32B 2439/70* (2013.01)

(58) Field of Classification Search
CPC .................................................... B32B 15/085
USPC .................................................. 428/522, 521
See application file for complete search history.

(56) References Cited

U.S. PATENT DOCUMENTS

| | | |
|---|---|---|
| 3,480,464 A | 11/1969 | Lacy |
| 5,750,252 A | 5/1998 | Danner et al. |
| 8,729,200 B2 | 5/2014 | Hermel-Davidock et al. |

(Continued)

FOREIGN PATENT DOCUMENTS

| | | |
|---|---|---|
| EP | 2580279 | 4/2013 |
| JP | 200111452 | 7/2011 |

(Continued)

OTHER PUBLICATIONS

PCT Search Report dated Dec. 12, 2013; from counterpart PCT Application No. PCT/US2013/049007.

(Continued)

*Primary Examiner* — Terressa Boykin
(74) *Attorney, Agent, or Firm* — Brooks, Cameron & Huebsch, PLLC

(57) ABSTRACT

A multi-layer structure comprising: (a) a skin layer comprising at least 50% by weight of an ethylene/α-olefin interpolymer composition (LLDPE) having a Comonomer Distribution Constant (CDC) in the range of from 45 to 400, and wherein the skin layer does not contain any migratory additive; (b) a metal layer disposed on the skin layer to form a metalized film; and (c) at least one substrate layer laminated onto the metallized film; wherein the ethylene/α-olefin interpolymer composition comprises (i) less than or equal to 100 percent by weight of the units derived from ethylene; and (ii) less than 30 percent by weight of units derived from one or more α-olefin comonomers is provided.

9 Claims, 2 Drawing Sheets

(51) Int. Cl.
  *B32B 27/06*  (2006.01)
  *B32B 27/08*  (2006.01)

(56) References Cited

U.S. PATENT DOCUMENTS

| | | |
|---|---|---|
| 8,829,115 B2 | 9/2014 | Hermel-Davidock et al. |
| 2006/0222796 A1 | 10/2006 | Morris |
| 2007/0224376 A1 | 9/2007 | Ambroise |
| 2011/0003129 A1 | 1/2011 | Mandare et al. |
| 2011/0003940 A1 | 1/2011 | Karjala et al. |
| 2012/0295102 A1 | 11/2012 | Fang et al. |

FOREIGN PATENT DOCUMENTS

| | | |
|---|---|---|
| WO | WO2011159376 | 12/2011 |
| WO | WO2012061168 | 5/2012 |

OTHER PUBLICATIONS

PCT IPRP dated Dec. 29, 2015; from counterpart PCT Application No. PCT/US2013/049007.
Chinese Office Action dated Feb. 16, 2017; from Chinese counterpart Application No. 201380077620.9.
EP Office Action dated Nov. 22, 2016; from EP counterpart Application No. 13887746.9.

METALLIZED POLYETHYLENE FILM WITH IMPROVED METAL ADHESION

FIELD OF INVENTION

The instant invention relates to a metalized polyethylene film with improved metal adhesion.

BACKGROUND OF THE INVENTION

Commercially available metallized packaging films made from polyethylene (PE) face issues of poor metal adhesion and bond strengths limiting their end use application. These metalized PE films have PE in the skin layer(s) which may contain low molecular weight fractions of PE and low molecular weight high comonomer fractions of linear low density polyethylene (LLDPE). Such PE-based metallized films typically exhibit very poor bond strength due to poor metal adhesion to the metalized skin layer leading to challenges during lamination as well as poor barrier properties due to metal transfer. It would be desirable to produce metalized polyolefin films having the desired stiffness and also with improved metal adhesion properties.

SUMMARY OF THE INVENTION

The instant invention is a multi-layer structure.

In one embodiment, the instant invention provides a multi-layer structure (laminate) comprising: (a) a skin layer comprising at least 50% by weight of an ethylene/α-olefin interpolymer composition (LLDPE) having a Comonomer Distribution Constant (CDC) in the range of from 45 to 400, and wherein the skin layer does not contain migratory additives selected from the group consisting of; (b) a metal layer disposed on the skin layer to form a metalized film; and (c) at least one substrate layer laminated onto the metallized film; wherein the ethylene/α-olefin interpolymer composition comprises (i) less than or equal to 100 percent by weight of the units derived from ethylene; and (ii) less than 30 percent by weight of units derived from one or more α-olefin comonomers.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
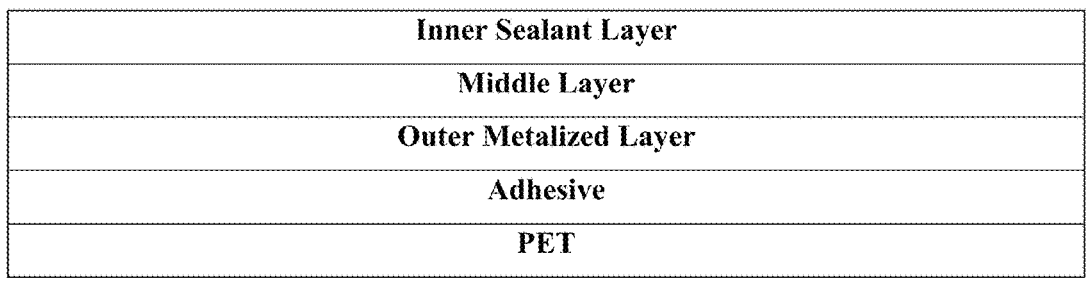
FIG. 1 is a schematic illustrating an exemplary multilayered metalized polyethylene/polyethylene terephthalate film made using adhesive lamination.

The instant invention is a metalized polyethylene film with improved metal adhesion.

As used herein, the term "ethylene-based polymer" refers to a polymer having more than 50 mole percent units derived from ethylene monomer (based on the total amount of polymerizable monomers), and, optionally, one or more comonomers.

As used herein, the term "homopolymer" is a polymer that is formed from only a single type of monomer, such as ethylene.

As used herein, the term "interpolymer" refers to polymers prepared by the copolymerization of at least two different types of monomers. The term interpolymer includes copolymers, usually employed to refer to polymers prepared from two different monomers, and polymers prepared from more than two different types of monomers, such as terpolymers.

As used herein, the term "migratory additives" means calcium stearate, DHT, slip agents, stearic acid, antistatic agents, and lubricants, individually and collectively.

The multi-layer structure according to the present invention comprises: a multi-layer structure (laminate) comprising: (a) a skin layer comprising at least 50% by weight of an ethylene/α-olefin interpolymer composition (LLDPE) having a Comonomer Distribution Constant (CDC) in the range of from 45 to 400, and wherein the skin layer does not contain migratory additives selected from the group consisting of; (b) a metal layer disposed on the skin layer to form a metalized film; and (c) at least one substrate layer laminated onto the metallized film; wherein the ethylene/α-olefin interpolymer composition comprises (i) less than or equal to 100 percent by weight of the units derived from ethylene; and (ii) less than 30 percent by weight of units derived from one or more α-olefin comonomers.

The at least one skin layer comprises at least 50% by weight of an ethylene/α-olefin interpolymer composition (LLDPE) having a Comonomer Distribution Constant (CDC) in the range of from 45 to 400. All individual values and subranges from at least 50% by weight LLDPE are included herein and disclosed herein; for example, the amount of the LLDPE in the skin layer can be from a lower limit 50, 55, 60, 65, 70, 75, 80, 85, 90, or 95% by weight to an upper limit of 55, 60, 65, 70, 75, 80, 85, 90, 95 or 100% by weight. For example, the amount of the LLDPE in the skin layer may be in the range of from 50 to 100% by weight, or in the alternative, the amount of the LLDPE in the skin layer may be in the range of from 75 to 100% by weight, or in the alternative, the amount of the LLDPE in the skin layer may be in the range of from 50 to 75% by weight, or in the alternative, the amount of the LLDPE in the skin layer may be in the range of from 75 to 95% by weight, or in the alternative, the amount of the LLDPE in the skin layer may be at least 50% by weight, or in the alternative, the amount of the LLDPE in the skin layer may be at least 75% by weight, or in the alternative, the amount of the LLDPE in the skin layer may be at least 85% by weight, or in the alternative, the amount of the LLDPE in the skin layer may be at least 95% by weight.

LLDPE Skin Layer Component

The skin layer comprises at least 50 percent by weight (wt %) of LLDPE (an ethylene/α-olefin interpolymer) composition which comprises (a) less than or equal to 100 percent, for example, at least 70 percent, or at least 80 percent, or at least 90 percent, by weight of the units derived from ethylene; and (b) less than 30 percent, for example, less than 25 percent, or less than 20 percent, or less than 10 percent, by weight of units derived from one or more α-olefin comonomers. The term "ethylene/α-olefin interpolymer composition" refers to a polymer that contains more than 50 mole percent polymerized ethylene monomer (based on the total amount of polymerizable monomers) and, optionally, may contain at least one comonomer.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The ethylene/α-olefin interpolymer composition is characterized by having a Comonomer Distribution Constant (CDC) in the range of from greater than from 45 to 400. All individual values and subranges from 45 to 400 are included herein and disclosed herein; for example, the CDC may range from a lower limit of 45, 75, 150, 205, 295, or 375 to an upper limit of 50, 100, 275, 345, or 400. For example, the CDC may range from 45 to 400, or in the alternative, from 75 to 300, or n the alternative, from 75 to 200, or in the alternative, from 85 to 150, or in the alternative, from 85 to 125.

In a particular embodiment, the LLDPE has a CDC in the range of from 75 to 200, a vinyl unsaturation of less than 0.15 vinyls per one thousand carbon atoms present in the backbone of the ethylene-based polymer composition; a zero shear viscosity ratio (ZSVR) in the range from 2 to 20; a density in the range of from 0.903 to 0.950 g/cm³, a melt index ($I_2$) in a range of from 0.1 to 5 g/10 minutes, a molecular weight distribution (Mw/Mn) in the range of from 1.8 to 3.5

In a particular embodiment, the LLDPE is characterized by having a zero shear viscosity ratio (ZSVR) in the range of from 2 to 20, for example, from 2 to 10, or from 2 to 6, or from 2.5 to 4.

In a particular embodiment, the LLDPE has a density in the range of 0.903 to 0.950 g/cm³. For example, the density can be from a lower limit of 0.903, 0.905, 0.908, 0.910, or 0.912 g/cm³ to an upper limit of 0.925, 0.935, 0.940, 0.945, 0.950 g/cm³.

In another embodiment, the LLDPE has a molecular weight distribution ($M_w/M_n$) in the range of from 1.8 to 3.5. For example, the molecular weight distribution ($M_w/M_n$) can be from a lower limit of 1.8, 2, 2.1, or 2.2 to an upper limit of 2.5, 2.7, 2.9, 3.2, or 3.5.

In yet another embodiment, the LLDPE has a melt index ($I_2$) in the range of 0.1 to 5 g/10 minutes. For example, the melt index ($I_2$) can be from a lower limit of 0.1, 0.2, 0.5, or 0.8 g/10 minutes to an upper limit of 1.2, 1.5, 1.8, 2.0, 2.2, 2.5, 3.0, 4.0, 4.5 or 5.0 g/10 minutes.

In another embodiment, the LLDPE has a molecular weight ($M_w$) in the range of 50,000 to 250,000 daltons. For example, the molecular weight ($M_w$) can be from a lower limit of 50,000, 60,000, 70,000 daltons to an upper limit of 150,000, 180,000, 200,000 or 250,000 daltons.

In a particular embodiment, the LLDPE has a molecular weight distribution ($M_z/M_w$) in the range of less than 4, for example, less than 3, or from 2 to 2.8.

In a particular embodiment, the LLDPE has a vinyl unsaturation of less than 0.15 vinyls per one thousand carbon atoms present in the backbone of the ethylene-based polymer composition.

In a particular embodiment, the LLDPE has a tong chain branching frequency in the range of from 0.02 to 3 long chain branches (LCB) per 1000 Carbon atoms.

In one embodiment, the ethylene/α-olefin interpolymer composition comprises less than or equal to 100 parts, for example, less than 10 parts, less than 8 parts, less than 5 parts, less than 4 parts, less than 1 parts, less than 0.5 parts, or less than 0.1 parts, by weight of metal complex residues remaining from a catalyst system comprising a metal complex of a polyvalent aryloxyether per one million parts of the ethylene-based polymer composition. The metal complex residues remaining from the catalyst system comprising a metal complex of a polyvalent aryloxyether in the ethylene-based polymer composition may be measured by x-ray fluorescence (XRF), which is calibrated to reference standards. The polymer resin granules can be compression molded at elevated temperature into plaques having a thickness of about ⅜ of an inch for the x-ray measurement in a preferred method. At very low concentrations of metal complex, such as below 0.1 ppm, ICP-AES would be a suitable method to determine metal complex residues present in the ethylene-based polymer composition.

The ethylene/α-olefin interpolymer composition may further comprise additional components such as one or more other polymers and/or one or more additives. Such additives include, but are not limited to, color enhancers, dyes, fillers such as $TiO_2$ or $CaCO_3$, opacifiers, nucleators, processing aids, pigments, primary antioxidants, secondary antioxidants, processing aids, UV stabilizers, anti-blocks, and combinations thereof. The ethylene-based polymer composition may contain from about 0.1 to about 10 percent by the combined weight of such additives, based on the weight of the ethylene-based polymer composition including such additives.

In one embodiment, ethylene/α-olefin interpolymer composition has a comonomer distribution profile comprising a monomodal distribution or a bimodal distribution in the temperature range of from 35° C. to 120° C., excluding purge.

Any conventional ethylene (co)polymerization reaction processes may be employed to produce the ethylene-based polymer composition. Such conventional ethylene (co)polymerization reaction processes include, but are not limited to, gas phase polymerization process, slurry phase polymerization process, solution phase polymerization process, and combinations thereof using one or more conventional reactors, e.g. fluidized bed gas phase reactors, loop reactors, stirred tank reactors, batch reactors in parallel, series, and/or any combinations thereof.

In one embodiment, the ethylene/α-olefin interpolymer composition is prepared via a process comprising the steps of: (a) polymerizing ethylene and optionally one or more α-olefins in the presence of a first catalyst to form a semi-crystalline ethylene-based polymer in a first reactor or a first part of a multi-part reactor; and (b) reacting freshly supplied ethylene and optionally one or more α-olefins in the presence of a second catalyst comprising an organometallic catalyst thereby forming an ethylene/α-olefin interpolymer composition in at least one other reactor or a later part of a multi-part reactor, wherein at least one of the catalyst systems in step (a) or (b) comprises a metal complex of a polyvalent aryloxyether corresponding to the formula:

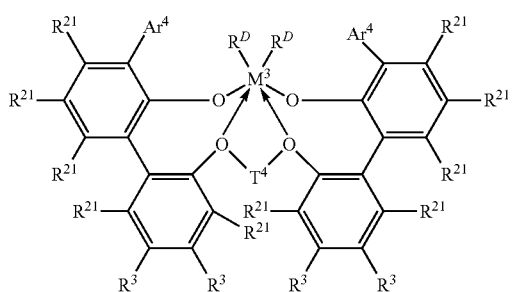

wherein $M^3$ is Ti, Hf or Zr, preferably Zr; $Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

The ethylene/α-olefin interpolymer composition may be produced via a solution polymerization according to the following exemplary process.

All raw materials (ethylene, 1-octene) and the process solvent (a narrow boiling range high-purity isoparaffinic solvent commercially available under the tradename Isopar E from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to a pressure that is above the reaction pressure, approximate to 750 psig. The solvent and comonomer (1-octene) feed is pressurized via mechanical positive displacement pump to a pressure that is above the reaction pressure, approximately 750 psig. The individual catalyst components are manually batch diluted to specified component concentrations with purified solvent (Isopar E) and pressurized to a pressure that is above the reaction pressure, approximately 750 psig. All reaction feed flows are measured with mass flow meters, independently controlled with computer automated valve control systems.

The continuous solution polymerization reactor system may consist of two liquid full, non-adiabatic, isothermal, circulating, and independently controlled loops operating in a series configuration. Each reactor has independent control of all fresh solvent, monomer, comonomer, hydrogen, and catalyst component feeds. The combined solvent, monomer, comonomer and hydrogen feed to each reactor is independently temperature controlled to anywhere between 5° C. to 50° C. and typically 40° C. by passing the feed stream through a heat exchanger. The fresh comonomer feed to the polymerization reactors can be manually aligned to add comonomer to one of three choices: the first reactor, the second reactor, or the common solvent and then split between both reactors proportionate to the solvent feed split. The total fresh feed to each polymerization reactor is injected into the reactor at two locations per reactor roughly with equal reactor volumes between each injection location. The fresh feed is controlled typically with each injector receiving half of the total fresh feed mass flow. The catalyst components are injected into the polymerization reactor through specially designed injection stingers and are each separately injected into the same relative location in the reactor with no contact time prior to the reactor. The primary catalyst component feed is computer controlled to maintain the reactor monomer concentration at a specified target. The two cocatalyst components are fed based on calculated specified molar ratios to the primary catalyst component. Immediately following each fresh injection location (either feed or catalyst), the feed streams are mixed with the circulating polymerization reactor contents with static mixing elements. The contents of each reactor are continuously circulated through heat exchangers responsible for removing much of the heat of reaction and with the temperature of the coolant side responsible for maintaining isothermal reaction environment at the specified temperature. Circulation around each reactor loop is provided by a screw pump. The effluent from the first polymerization reactor (containing solvent, monomer, comonomer, hydrogen, catalyst components, and molten polymer) exits the first reactor loop and passes through a control valve (responsible for maintaining the pressure of the first reactor at a specified target) and is injected into the second polymerization reactor of similar design. As the stream exits the reactor, it is contacted with a deactivating agent, e.g. water, to stop the reaction. In addition, various additives such as antioxidants, can be added at this point. The stream then goes through another set of static mixing elements to evenly disperse the catalyst deactivating agent and additives.

Following additive addition, the effluent (containing solvent, monomer, hydrogen, catalyst components, and molten polymer) passes through a heat exchanger to raise the stream temperature in preparation for separation of the polymer from the other lower boiling reaction components. The stream then enters a two stage separation and devolatilization system where the polymer is removed from the solvent, hydrogen, and unreacted monomer and comonomer. The recycled stream is purified before entering the reactor again. The separated and devolatized polymer melt is pumped through a die specially designed for underwater pelletization, cut into uniform solid pellets, dried, and transferred into a hopper.

Additional Layers

Figure 2:
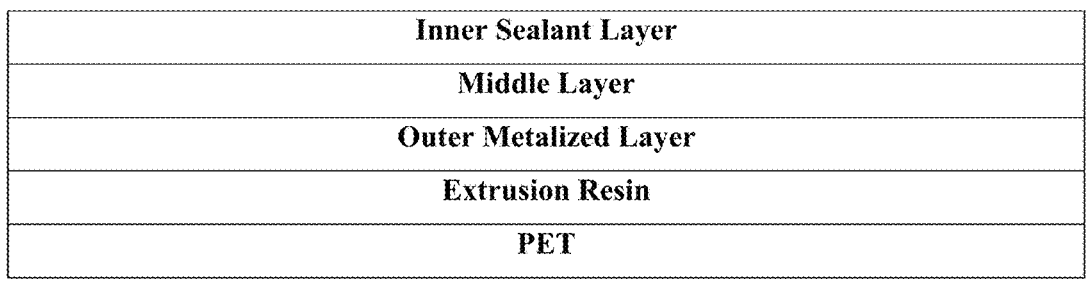
FIG. 2 is a schematic illustrating an exemplary multilayered metalized polyethylene/polyethylene terephthalate film made using extrusion lamination.

In some embodiments, the multilayerd film comprises one or more polymeric layers in addition to the skin layer. Such one or more additional layers comprise one or more components selected from the group consisting of ethylene-based polymers In one embodiment, the multilayerd film further comprises a second layer comprising LLDPE as described herein. In an alternative embodiment, the multilayerd film further comprises a second layer comprising high density polyethylene (HDPE) having a density from 0.94 to 0.965 g/cm$^3$. In an alternative embodiment, the multilayerd film comprises a skin layer, a core layer (as illustrated in FIGS. 1 and 2) comprising an HDPE, and a sealant layer comprising a low density polyethylene (LDPE), having a density from 0.92 to 0.923 g/cm$^3$.

The Substrate

The substrate may comprise any one or more materials suitable for use in multi-layer structure. Such materials include, for example, thermoplastics. Suitable thermoplastics include, for example, polyethylene terephthalate, polyethylene, cast polypropylene, biaxially oriented polypropylene, and any combination of two or more thereof.

Metallization

The metallization of the outer skin layer may be accomplished using any appropriate technique. In some embodiments, the LLDPE skin layer(s) may be pretreated, such as by corona treatment and plasma treatment, prior to metallization. Metallization may be performed by a physical vapor deposition process. In such processes, the metal is heated and evaporated under vacuum. The metal then condenses on the skin LLDPE layer.

In some embodiments, the resulting metallized skin layer exhibits an optical density of at least 2.0, All values and subranges from at least 2.0 are disclosed herein and disclosed herein; for example, the optical density of the metallized skin layer may range from a lower limit of 2.0 2.1 2.2, 2.3, 2.4, 2.5, 2.6, 2.7, or 2.8 to an upper limit of 2.0 2.1 2.2, 2.3, 2.4, 2.5, 2.6, 2.7, or 2.8. For example, the optical density of the metallized skin may range from at least 2.0, or in the alternative, the optical density of the metallized skin may range from at least 2.0, or in the alternative, the optical density of the metallized skin may range from at least 2.4, or in the alternative, the optical density of the metallized skin may range from at least 2.6, or in the alternative, the optical density of the metallized skin may be from 2.0 to 2.8, or in the alternative, the optical density of the metallized skin may be from 2.0 to 2.5, or in the alternative, the optical density of the metallized skin may be from 2.4 to 2.8, or in the alternative, the optical density of the metallized skin may be from 2.3 to 2.7.

Any appropriate metal may be used, generally dependent upon the final end use application for the multi-layer article. Commonly used metals include aluminum, nickel and chromium.

Multi Layer Structure

The multi-layer structure according to the various embodiments may be selected from the group consisting of films, pouches, and packaging films.

In an alternative embodiment, the instant invention provides a structure, in accordance with any of the preceding embodiments, except that the article is laminated, printed and/or formed into a shape.

In an alternative embodiment, the instant invention provides an article, in accordance with any of the preceding embodiments, except that the article is a film produced by a cast process or a blown film process.

In an alternative embodiment, the instant invention provides an article, in accordance with any of the preceding embodiments, except that the metallized skin has an optical density from 2 to 3. All values and subranges from 2 to 3 are disclosed herein and included herein; for example, the optical density can be from a lower limit of 2, 2.1, 2.2, 2.3, 2.4, 2.5, 2.6, 2.7, 2.8 or 2.9 to an upper limit of 2.1, 2.2, 2.3, 2.4, 2.5, 2.6, 2.7, 2.8, 2.9, or 2. For example, the metallized skin may have an optical density from 2 to 3, or in the alternative, the metallized skin may have an optical density from 2.5 to 3, or in the alternative, the metallized skin may have an optical density from 2 to 2.5, or in the alternative, the metallized skin may have an optical density from 2.3 to 2.7.

EXAMPLES

The following examples illustrate the present invention but are not intended to limit the scope of the invention.

In all the inventive examples the antiblock additive used was ANTIBLOCK 63 10063-K, which is 20% active ingredient in a Polyethylene carrier resin, commercially available from Ampacet (Thailand) Co., Ltd, Rayong-Thailand Inventive Multi-Layered Film Example 1

A three layer film, having a skin layer, a core layer abutting the skin layer on a first side of the core layer and a sealant layer abutting the core layer on a second side of the core layer. 50 kg of an experimental LLDPE (EXPERIMENTAL EPE 1), having the properties shown in Table 2, was used to make a three layer blown film with EXPERIMENTAL EPE 1 in the skin layer (layer to be metallized) and the sealant layer. The core layer was ELITE™ 5960G. A blown film machine used to make the three layer blown film are as follows: three layer blown film screw type extruder for LDPE and LLDPE (linear low density polyethylene) having a die diameter of 400 mm, die gap of 2.2 mm, BUR of 2.5 and bubble cooling with IBC, output of 420 kg/hr, film width maximum of 2200 mm, film thickness of 40 micron, layer ratio of 1:1.5:1 and corona treatment of about 46 dynes. The melt temperature was kept at 225° C. and die temperature at 220° C. Table 1 below provides the zone temperatures (in ° C.) for each of the three layers and die for the blown film machine used to produce Inventive Multi-Layered Film Example 1.

TABLE 1

| EXTRUDERS | Zone 1 | Zone 2 | Zone 3 | Zone 4 | Zone 5 | Screen | Adapter |
|---|---|---|---|---|---|---|---|
| Sealant layer | 195 | 210 | 215 | 215 | 215 | 215 | 215 |
| Core layer | 230 | 230 | 230 | 230 | 230 | 230 | 230 |
| Skin layer (layer to be metallized) | 195 | 210 | 215 | 215 | 215 | 215 | 215 |
| DIE | 215 | 220 | 220 | 220 | 220 | 220 | 220 |

Table 2 provides density, I$_2$ and supplier for the resins used in producing Inventive Example. Table 3 exhibits the structure of Inventive Multi-Layered Film Example 1 and provides compositional information for each layer in the multi-layered film.

TABLE 2

| Resin | I$_2$ (190° C., g/10 min) | Density (g/cc) | Supplier |
|---|---|---|---|
| EXPERIMENTAL EPE 1 | 0.85 | 0.907 | Not commercially available |
| ELITE 5960 | 0.85 | 0.962 | The Dow Chemical Company |

TABLE 2-continued

| Resin | $I_2$ (190° C., g/10 min) | Density (g/cc) | Supplier |
|---|---|---|---|
| LDPE LOTRENE FB3003 | 0.27 | 0.920 | Qatar Petrochemical Company Q.S.C (QAPCO) (Qatar) |

TABLE 3

| Layer | Resin Composition | Layer Ratio (%) | Layer Thickness (micron) |
|---|---|---|---|
| Sealant layer | EXPERIMENTAL EPE 1 (80%) + LDPE (12%) + Antiblock MB (8%) | 28 | 11 |
| Core layer | ELITE™ 5960G (100%) | 44 | 18 |
| Skin layer (layer to be metallized) | EXPERIMENTAL EPE 1 (85%) + LDPE (12%) + Antiblock MB (2%) + polymer processing aid (PPA) 1% | 28 | 11 |

Inventive Multi-Layered Film Example 1 was metallized using an PLASMA metallizer under vacuum of 10-6 bar and at around 600 deg C. to form Inventive Metalized Film Example 1. An optical density of 2.6 was achieved.

Inventive Metalized Film Example 1 was laminated to a 10 micron chemically coated polyethylene terephthalate (PET) film using adhesive lamination with polyurethane adhesive to produce Inventive Multi-Layered Structure 1 Example. Table 4 provides the selected physical property data of Inventive Multi-Layered Structure Example 1.

TABLE 4

| PROPERTY | UNIT | Inventive Multi-Layered Structure Example 1 |
|---|---|---|
| Thickness | μm | 56.9 |
| TENSILE - ASTM D882 | | |
| Yield Stress (MD) | MPa | — |
| Ult Tensile Strength (MD) | MPa | 48.9 |
| Ult Elongation (MD) | % | 75.4 |
| Tensile Energy (MD) | J | 2.19 |
| Yield Stress (TD) | MPa | — |
| Ult Tensile Strength (TD) | MPa | 53 |
| Ult Elongation (TD) | % | 70.3 |
| Tensile Energy (TD) | J | 2.17 |
| MODULUS - ASTM D882 | | |
| Young Modulus (MD) | MPa | 1160 |
| Secant Modulus @1% (MD) | MPa | 993.77 |
| Secant Modulus @2% (MD) | MPa | 1009.97 |
| Young Modulus (TD) | MPa | 1330 |
| Secant Modulus @1% (TD) | MPa | 1162.49 |
| Secant Modulus @2% (TD) | MPa | 1101.5 |
| BOND STRENGTH | | |
| Maximum Force | N/25 mm | 4.569 |
| Average Force | N/25 mm | 4.326 |

The conditions for determining Water Vapor Transmission Rate (WVTR) according to ASTM F 1249 were as follows: temperature=37.8° C.; relative humidity=100%; sample size=10 cm$^2$; and carrier gas=N$_2$. The conditions for determining Oxygen Transmission Rate (OTR) according to ASTM T3985 were as follows: temperature=23.0° C.; relative humidity=0%; sample size=100 cm$^2$; and carrier gas=N$_2$. Inventive Multi-layered Structure 1 had an WVTR of 0.62 gm/m$^2$/day and an OTR of 2.92 cc/m$^2$/day.

Bond Strength

Bond Strength sample preparation and measurements were performed according to the following methods.

Sample Preparation

1. Cut a one inch sample strip from the laminate to be tested. Samples can be cut from any direction.
2. There will need to be delaminate tabs for each two substrates long enough to fit between the jaws of the tensile tester such that the tester will read zero at the beginning of the test. The start of the laminated area should be perpendicular to the direction of the tab which is also referred to as 'T-Peel'.
3. Delamination can be done by a few methods. Organic solvents can be used to delaminate the one inch sample point to release the bond slightly in order for the tabs to be secured to the jaws.

Bond Strength Measurement

1. Place the sample in the jaws of the zeroed tensile tester.
2. The crosshead speed of the tensile tester is set to 250 mm/min.
3. Record the bond strength measurement and the mode of failure.

Table 4 also illustrates the good bond strength achieved when the Inventive Multi-Layered Structure 1 is produced using adhesive lamination. Furthermore, no metal transfer was observed during lamination for the Inventive Multi-Layered Structure Example 1.

Figure 3:
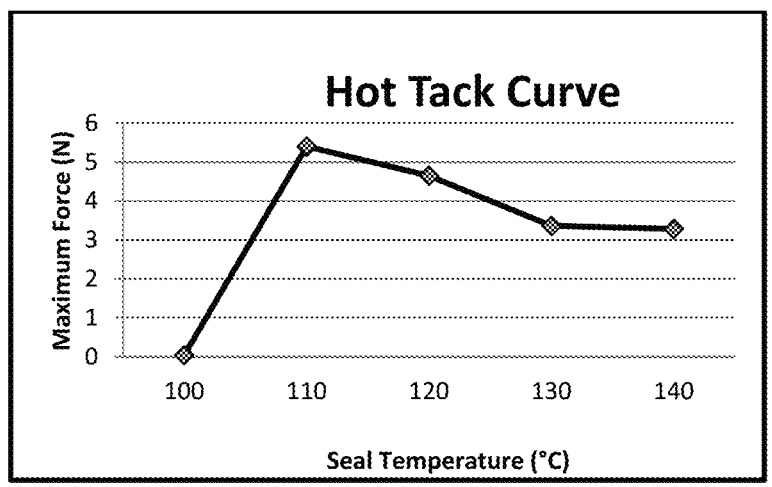
FIG. 3 is a graph illustrating the hot tack properties of Inventive Multi-Layered Structure Example 1.

Hot tack of Inventive Multi-Layered Structure Example 1 was measured on a J&B Hot Tack tester, 4000 Sealing Width (mm): 25; Sealing Time (sec): 0.5 Sealing Pressure (N/mm2): 0.275; Peel Speed (mm/sec): 200. FIG. 3 illustrates the hot tack properties of Inventive Multi-Layered Structure Example 1, which exhibited hot tack value of 5.5N/25 mm.

Figure 4:
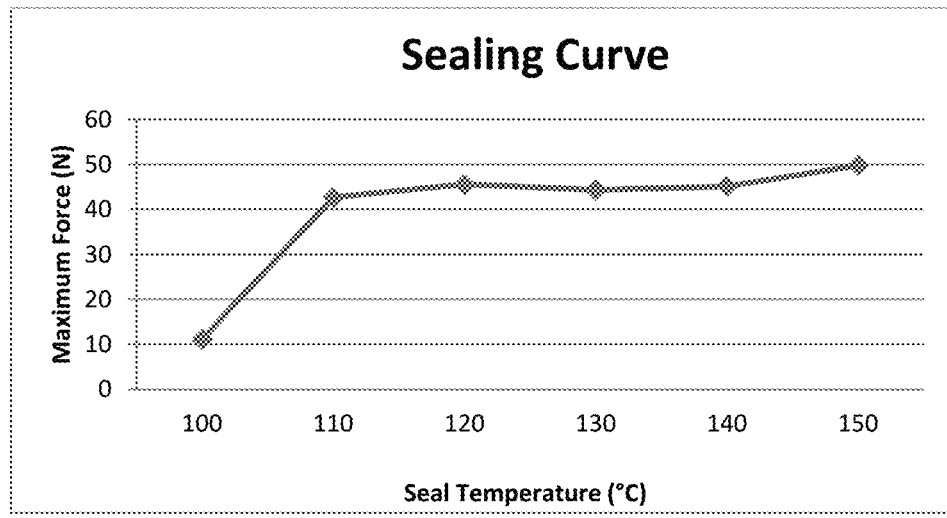
FIG. 4 is a graph illustrating the seal strength behavior of Inventive Multi-Layered Structure Example 1.

Seal strength of Inventive Example was measured on a J&B Hot Tack tester, 4000 Sealing Width (mm): 25; Sealing Time (sec): 0.5 Sealing Pressure (N/mm$^2$): 0.275; Conditioning time (hr): approximate 24 Zwick sTest Speed (mm/min): 50. FIG. 4 illustrates the seal strength behavior of Inventive Multi-Layered Structure Example, which had a seal strength of more than 4 kg/25 mm.

Inventive Example 2

A second three layer blown film, Inventive Multi-Layered Film Example 2, was also made using the resins shown in Table 4.

TABLE 4

| Resin | $I_2$ (190° C., g/10 min) | Density (g/cc) |
|---|---|---|
| EXPERIMENTAL EPE 1 | 0.85 | 0.907 |
| ELITE ™ 5960 | 0.85 | 0.962 |
| RELENE 1020FA20 | 2 | 0.92 |

RELENE 1020FA20 is a low density polyethylene resin commercially available from Reliance Industries Ltd. (India). Inventive Multi-Layered Film Example 2 was made on a commercial three layer blown film, screw-type machine for LDPE and LLDPE with mixing sections; die diameter of 325 mm; die gap of 2.5 mm; BUR of 2.0; bubble cooling: with IBC; output of 195 kg/hr; film width maximum of 1230 mm; film thickness of 40 micron; layer Ratio of 1:1.5:1; and corona treatment of about 50 dynes. Table 5 provides the zone temperatures, in ° C., for the blown film machine in preparing Inventive Multi-Layered Film Example 2

TABLE 5

| EXTRUDERS | Zone 1 | Zone 2 | Zone 3 | Zone 4 | Adapter | Screen |
|---|---|---|---|---|---|---|
| Sealant layer | 180 | 185 | 195 | 200 | 205 | 208 |
| Core layer | 205 | 205 | 210 | 215 | 220 | 220 |
| Skin layer (layer to be metallized) | 180 | 185 | 195 | 200 | 205 | 208 |
| DIE | 220 | 220 | 220 | 220 | 225 | 225 |

The resulting Inventive Multi-Layered Film Example 2 had the structure illustrated in Table 6.

TABLE 6

| Layer | Resin Composition | Layer Thickness (micron) |
|---|---|---|
| Sealant layer | EXPERIMENTAL EPE 1 (80%) + RELENE 1020FA20 (10%) + Antiblock MB (10%) | 11 |
| Core layer | ELITE ™ 5960G (100%) | 18 |
| Skin layer (layer to be metallized) | EXPERIMENTAL EPE 1 (88%) + RELENE 1020FA20 (10%) + Antiblock MB (2%) | 11 |

Inventive Multi-Layered Film Example 2 was metallized using a plasma metalizer obtaining an optical density of 2.2 to produce Inventive Metalized Film Example 2. Inventive Metalized Film Example 2 was laminated onto a 12 micron PET film producing Inventive Multi-Layered Structure Example 2.

Inventive Multi-Layered Film Example 2 was also laminated to a 15 micron biaxially oriented polypropylene (BOPP) film producing Inventive Multi-Layered Structure Example 3. Both Inventive Multi-Layered Structure Examples 2 and 3 were made using an extrusion lamination process with LDPE as a tie resin.

No metal transfer was observed in either of Inventive Multi-Layered Structure Examples 2 or 3, indicating excellent metal adhesion to PE.

The bond strength of Inventive Multi-Layered Structure Examples 2 and 3 is given in Table 7.

TABLE 7

| BOND STRENGTH | UNIT | Inventive Example 5 | Inventive Example 4 |
|---|---|---|---|
| Maximum Force | N/25 mm | 2.37 | 2.29 |

Test Methods

Test methods include the following:

Resin density was measured in accordance with ASTM Method D-792.

$I_2$ (for ethylene based resins) was measured in accordance with ASTM Method D-1238.

The present invention may be embodied in other forms without departing from the spirit and the essential attributes thereof, and, accordingly, reference should be made to the appended claims, rather than to the foregoing specification, as indicating the scope of the invention.

We claim:

1. A multi-layer structure comprising:
   (a) a skin layer comprising at least 50% by weight of an ethylene α-olefin interpolymer composition (LLDPE) having a Comonomer Distribution Constant (CDC) in the range of from 45 to 400, and wherein the skin layer does not contain any migratory additive;
   (b) a metal layer disposed on the skin layer to form a metalized film; and
   (c) at least one substrate layer laminated onto the metallized film;
   wherein the ethylene/α-olefin interpolymer composition comprises (i) less than or equal to 100 percent by weight of the units derived from ethylene; and (ii) less than 30 percent by weight of units derived from one or more α-olefin comonomers.

2. The multi-layer structure according to claim 1, wherein the ethylene/α-olefin interpolymer composition has a Comonomer Distribution Constant (CDC) in the range of from 75 to 200, a vinyl unsaturation of less than 0.15 vinyls per one thousand carbon atoms present in the backbone of the ethylene-based polymer composition; a zero shear viscosity ratio (ZSVR) in the range from 2 to 20; a density in the range of from 0.903 to 0.950 g/cm3, a melt index (I2) in a range of from 0.1 to 5 g/ 10 minutes, a molecular weight distribution (Mw/Mn) in the range of from 1.8 to 4.

3. The multi-layer structure according to claim 1, wherein the at least one substrate layer comprises at least one selected from the group consisting of polyethylene, cast polypropylene, biaxially oriented polypropylene, and biaxially oriented polyethylene terephthalate.

4. The multi-layer structure according to claim 1, wherein the metalized film further comprises one or more additional polyethylene layers.

5. The multi-layer structure according to claim 1, wherein the metalized film is laminated onto the substrate by adhesive lamination or extrusion lamination and wherein the multi-layer structure exhibits better bond strength and less metal transfer in comparison to a multi-layer structure having the same composition except that the skin layer contains one or more migratory additive.

6. The multi-layer structure according to claim 1, wherein the structure is a pouch or packaging film.

7. The multi-layer structure according to claim 1, wherein the structure is laminated, printed and/or formed into a shape.

8. The multi-layer structure according to claim 1, wherein the multilayer film is produced by cast film process or a blown film process.

9. The multi-layer structure according to claim 1, wherein the metalized film has an optical density from 2 to 3.

* * * * *